United States Patent [19]

Kuhn, Jr.

[11] 4,175,835

[45] Nov. 27, 1979

[54] FLOATING HEAD LASER MIRROR ASSEMBLY

[75] Inventor: Ralph F. Kuhn, Jr., Calabasas, Calif.

[73] Assignee: The United States of America as represented by the Secretary of the Air Force, Washington, D.C.

[21] Appl. No.: 926,358

[22] Filed: Jul. 20, 1978

[51] Int. Cl.² .............................................. G02B 7/18
[52] U.S. Cl. .................................................. 350/310
[58] Field of Search ............................. 350/310, 288

[56] References Cited

U.S. PATENT DOCUMENTS

| | | | |
|---|---|---|---|
| 1,801,285 | 4/1931 | Mills | 350/310 |
| 3,637,296 | 1/1972 | McLafferty et al. | 350/310 |
| 3,676,274 | 7/1972 | Matulis | 350/310 |
| 3,708,223 | 1/1973 | Sorensen et al. | 350/310 |
| 3,731,992 | 5/1973 | Mansell | 350/310 |
| 3,781,094 | 12/1973 | Griest | 350/310 |
| 3,926,510 | 12/1975 | Locke et al. | 350/310 |
| 3,942,880 | 3/1976 | Zeiders, Jr. | 350/310 |
| 4,060,315 | 11/1977 | Heinz | 350/310 |

*Primary Examiner*—Jon W. Henry
*Attorney, Agent, or Firm*—Joseph E. Rusz; Jacob N. Erlich

[57] ABSTRACT

A high power floating head laser mirror assembly having a mirror head, a base structure and a plurality of flexure elements interposed between the mirror head and the base structure for "floatingly" supporting the mirror head with respect to the base structure. In order to preserve proper mirror head alignment and yet allow radial expansion of the mirror head a plurality of posts are located adjacent the flexure elements thereby exposing only a predetermined portion of the flexure element. As a result of the above assembly, the mirror surface is capable of reliable operation within a laser having a light intensity in excess of 5 Kw/cm².

9 Claims, 4 Drawing Figures

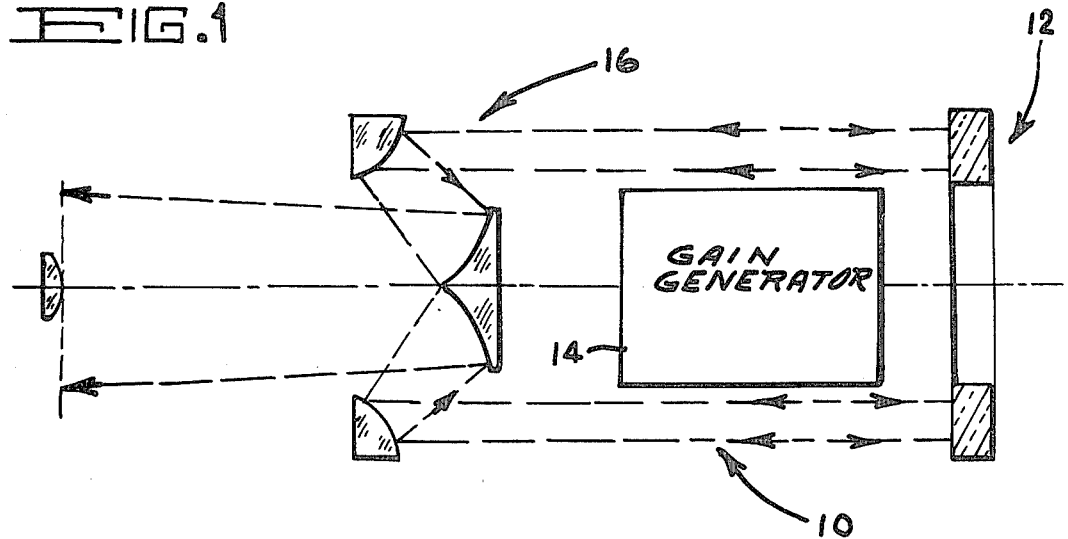
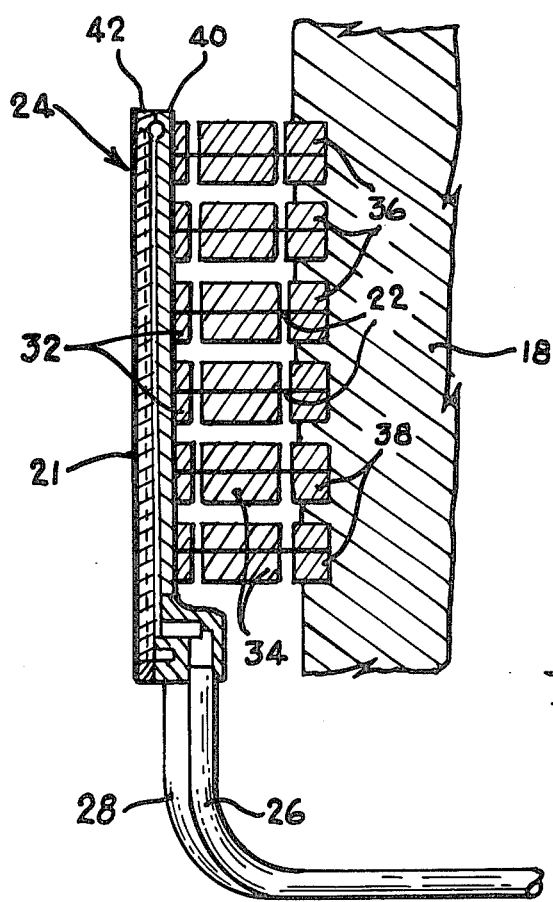

FLOATING HEAD LASER MIRROR ASSEMBLY

STATEMENT OF GOVERNMENT INTEREST

The invention described herein may be manufactured and used by or for the Government for governmental purposes without the payment of any royalty thereon.

BACKGROUND OF THE INVENTION

This invention relates generally to lasers, and, more particularly to a floating head mirror assembly for use within the optical or resonant cavity of a laser.

The development of the laser has created a new area of technology which finds application in many systems already in existence today. For example, lasers can be found in the area of optical communications, holography, medicine, cutting, calculating and in radar. The utilization of the laser in such areas is in many instances dependent upon the amplification of the existing laser radiation.

In certain areas, such as in optical communication or optical radar, it is necessary to greatly amplify the initial radiation power produced by the laser. One such laser which produces high output power is the cylindrical chemical laser. In such a laser, or in most conventional lasers, the "optical or resonant cavity" of the laser typically comprises plane parallel or curved mirrors located at right angles to the axis of the cylindrical region. The cylindrical region may be a gas envelope or the like in which lasing action takes place. For laser operation, one of the mirrors is required to be partially transmissive in order to extract a useful beam of coherent light from the "optical cavity."

It has long been recognized that the alignment and optical figure of the mirrors of the laser are of critical importance in order to maintain maximum output. Frequently, laser mirrors after being correctly aligned, particularly mirrors used in chemical lasers and gas dynamic lasers, are exposed to such intense light as to be subjected to radiative absorptive heating even with the best reflective surface. Such an environment causes substantial misalignment and distortion to the mirror. High power laser mirrors (greater than 5 Kw/cm$^2$ light intensity) tend to distort due to the heating of the reflective surface.

It is essential, however, that such surfaces be held within four micro-inches on DF lasers. When the mirror surface is heated, the lower base surface to which the mirror is attached generally remains at the starting temperature and as a result causes an output shearing force between the mirror surface and the base structure. This shear rotates the outer perimeter of the mirror. At present, the mere cooling of the mirror itself fails to overcome this problem. Consequently, as the high power requirements for the lasers increase, the difficulties of matching high power laser mirrors to the laser output requirements have become an expensive and sometimes virtually impossible task.

SUMMARY OF THE INVENTION

The instant invention overcomes the problems encountered in the past and as set forth hereinabove by providing a high power laser mirror assembly which is capable of isolating the mirror surface upon a plurality of radially movable flexure elements. The instant invention sets forth a high power laser mirror assembly which is capable of operating under large temperature differences between the mirror surface and the base structure while making the mirror insensitive to the temperature variations of the coolant to the base temperature, since the mirror surface heat exchanger and base are thermally isolated. Consequently, an extremely small base structure can therefore be utilized with the mirror assembly of the instant invention and as a result produce an extremely lightweight mirror assembly.

Since the high power laser mirror assembly of this invention is generally used with cylindrical chemical lasers it is constructed of an annular configuration. Supporting the annular configurated mirror surface are a plurality of supporting members forming the mirror head and which contain therein cooling channels. These members are in turn supported on a plurality of flexure elements operably connected at one end to the supporting members and at the other end to the base structure. In addition, each flexure element has mounted thereon or is embedded into a plurality of posts which aid in the support of the element itself. These posts give the mirror and supporting members sufficient rigidity so as to maintain its alignment during the laser operation. The flexure elements allow the mirror and supporting members to "float" or in other words expand in the radial direction in accordance with the variance in temperature during laser operation.

It is therefore an object of this invention to provide a high power laser floating head mirror assembly capable of operating under a wide temperature variance between the mirror and the base structure.

It is another object of this invention to provide a high power laser floating head mirror assembly in which the mirror and associated supporting members are capable of expanding uniformly in the radial direction without distorting.

It is still another object of this invention to provide a high power laser floating head mirror assembly capable of providing a minimal size and light weight mirror structure.

It is a further object of this invention to provide a high power laser floating head mirror assembly which is economical to produce and which utilizes conventional, currently available components that lend themselves to standard mass producing manufacturing techniques.

For a better understanding of this invention, together with other and further objects thereof, reference is made to the following description taken in conjunction with the accompanying drawing and its scope will be pointed out in the appended claims.

DETAILED DESCRIPTION OF THE DRAWING

FIG. 1 is a schematic representation of a high power cylindrical laser in which the floating head mirror assembly of this invention is utilized;

FIG. 4 is a side elevational view of the high power laser floating head mirror assembly of this invention showing in detail the flexure elements and post supports for the mirror partly in cross section.

DETAILED DESCRIPTION OF THE PREFERRED EMBODIMENT

Figure 2:
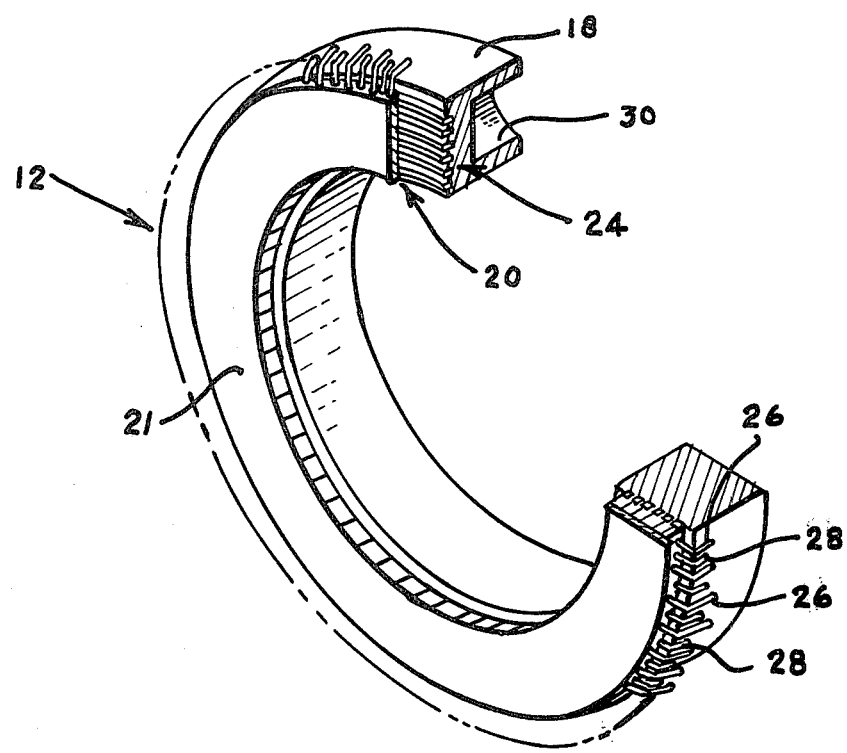
FIG. 2 is a segmented pictorial representation of a high power laser floating head mirror assembly shown partially in cross section.

Reference is now made to FIG. 1 of the drawing which illustrates in schematic fashion a conventional cylindrical laser 10. Cylindrical laser 10 incorporates therein the floating head laser mirror assembly 12 of this invention. In addition to mirror assembly 12, FIG. 1 also shows in operative relationship with mirror assembly 12 a conventional gain generator 14 and a conventional reflexicon 16 thereby completing, for illustrative purposes only, the optical or resonant cavity of laser 10. Also, as shown in FIG. 1 of the drawing, mirror assembly 12 is disclosed as being of annular configuration so as to be readily incorporated within cylindrical laser 10. However, it should be noted that the annular configuration of mirror assembly 12 is not to be construed as a limitation on the invention since mirror assembly 12 can be of any desirable laser mirror configuration as well as capable of operation within other types of lasers.

Reference is now made to FIG. 2 of the drawing which shows in pictorial fashion a segmented view of mirror assembly 12 of this invention. Mirror assembly 12 is made of two main components, a base structure 18 made of any suitable material such as beryllium and a mirror head 20 which includes the mirror or reflective surface 21. Supporting mirror head 20 in a "floating" relationship with respect to base structure 18 are a plurality of flexure elements 22 operably connected at one end to mirror head 20 and at the other end to base structure 18. The detailed description of this arrangement will be set forth hereinbelow with respect to FIGS. 3 and 4.

As stated hereinabove mirror assembly 12 is not limited to the annular configuration shown in the drawing but may be constructed of any desirable laser mirror assembly configuration. Also shown pictorially in FIG. 1 of the drawing are the plurality of coolant channels 24 and inlet and outlet lines 26 and 28, respectively. The entire mirror assembly 12 is mounted (not shown) by means of any suitable attachment points 30 to the supporting structure of laser 10 in any conventional manner such as being press fit thereon.

Figure 3:
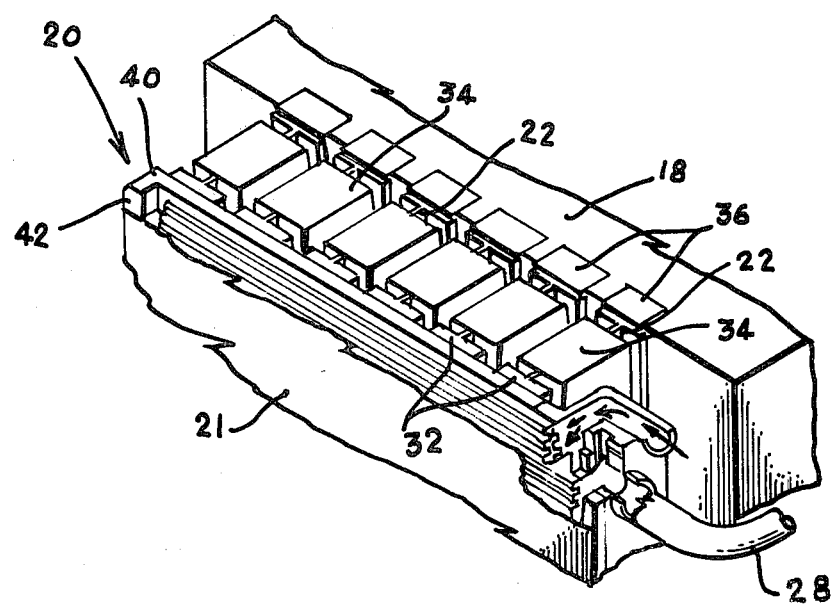
FIG. 3 is a detailed pictorial representation of the flexure elements and posts utilized in the floating support of the mirror assembly of this invention.

Reference is now made to FIGS. 3 and 4 of the drawing which clearly illustrate the "floating" arrangement of mirror assembly 12 of this invention. Each of the plurality of flexure elements 22 are made of any suitable thin, flat spring-like flexible material such as stainless steel. The following dimensions are given to set forth the relative size of flexure elements 22 for proper operation of mirror assembly 12. For example, each element 22 is approximately 0.975 inches in length and has a thickness of approximately 0.020 inches. Such an arrangement is capable of "floatingly" supporting mirror head 20 with respect to base support 18.

It is essential, however, that additional rigidity be built onto each flexure element 22. This additional support is in the form posts 32, 34 and 36, respectively, made of any suitable material such as nickel, molybdenum or copper. Posts 32 and 36 form the ends of each flexure element 22 while post 34 forms the intermediate support. Each post 32, 34 and 36 may be formed of either a pair of members adhered to the sides of elements 22 in a conventional manner or be formed of a single member having element 22 embedded therethrough. The distance between intermediate post 34 and end posts 32 and 36, respectively, is approximately 0.050 inches. Such an arrangement permits sufficient flexibility of mirror head 20 with respect to base structure 18 to allow expansion in the radial direction during a wide temperature variance between mirror surface 21 and base structure 18. Consequently, mirror surface 21 is maintained in constant alignment during laser operation.

Each flexure element 22 has its associated end post 36 secured in any conventional manner to base structure 18 such as by being press fit within identations 38 within base structure 18 as shown in FIGS. 3 and 4 of the drawing. Formed on the end of posts 32 is mirror head 20.

Mirror head 20 is made up of a plurality of layers of metallic material 40 and 42 and mirror surface 21. The first layer 40 is generally made of nickel or the like and electrodeposited upon posts 32 in a conventional manner. A plurality of flow channels 24 are then formed therein by any suitable procedure such as etching for purposes of allowing a coolant to flow therethrough and cool mirror assembly 12 in a conventional manner. A second layer 42 of nickel or the equivalent is electrodeposited upon layer 40 and also has a plurality of flow channels 24 therein. One group of flow channels 24 are attached to input line 26 while the other group of flow channels 24 are operably attached to output line 28. The third layer 21 of nickel is electrodeposited upon layer 42 and constitutes the reflective or mirror surface 21 of the floating head laser mirror assembly 12 of this invention.

The floating head laser mirror assembly 12 of this invention is therefore operably aligned within a laser for light intensity in excess of 5 Kw/cm$^2$. The alignment can be held to within 4 micro-inches as a result of the unique flexure element-post combination set forth above. Consequently, mirror assembly 12 is capable of accepting large temperature differences between the mirror surface 21 and base 18.

Although the invention has been described with reference to a particular embodiment it will be understood to those skilled in the art that this invention is also capable of a variety of alternate embodiments within the spirit and scope of the appended claims.

I claim:

1. A floating head laser mirror assembly comprising a base structure, a mirror head, a plurality of flexure elements, each of said flexure elements being operably connected between said mirror head and said base structure for supporting said mirror head with respect to said base structure in a floating relationship and at least one of said flexure elements having at least one post in direct contact therewith and located between said mirror head and said base structure, for adding a predetermined amount of rigidity to said one flexure element, said post being positioned so as to expose a predetermined portion of said one flexure element whereby said mirror head is capable of expanding in the radial direction during a wide temperature variance between said mirror head and said base structure.

2. A floating head laser mirror assembly as defined in claim 1 wherein there are three of said posts in direct contact with said one flexure element, the first of said posts being located adjacent said mirror head, the second of said posts being located adjacent said base structure and said third post being located intermediate said first and second posts.

3. A floating head laser mirror assembly as defined in claim 2 wherein said exposed portion of said one flexure element is located between said third post and said first and second posts, respectively.

4. A floating head laser mirror assembly as defined in claim 3 wherein two portions of said one flexure element are exposed, each of said exposed portions being approximately 0.050 inches in length.

5. A floating head laser mirror assembly as defined in claim 4 wherein the thickness of each of said flexure elements is approximately 0.020 inches.

6. A floating head laser mirror assembly as defined in claim 5 wherein said mirror head comprises three layers of electrodeposited material, two of said layers containing cooling channels therein and the third of said layers being optically relfective.

7. A floating head laser mirror assembly as defined in claim 5 wherein said base structure has at least one indentation therein and said second post is located within said indentation.

8. A floating head laser mirror assembly as defined in claim 5 wherein each of said posts is made of a pair of sections, each of said sections being located on opposite sides of said one flexure element.

9. A floating head laser mirror assembly as defined in claim 5 wherein said mirror head and said base structure are of an annular configuration.

* * * * *